United States Patent [19]

Calvarese

[11] Patent Number: 5,684,458

[45] Date of Patent: Nov. 4, 1997

[54] MICROWAVE SENSOR WITH ADJUSTABLE SAMPLING FREQUENCY BASED ON ENVIRONMENTAL CONDITIONS

[75] Inventor: Russell Calvarese, Stony Brook, N.Y.

[73] Assignee: Napco Security Systems, Inc., Amityville, N.Y.

[21] Appl. No.: 605,472

[22] Filed: Feb. 26, 1996

[51] Int. Cl.[6] .................................................. G08B 13/18
[52] U.S. Cl. ........................... 340/554; 340/552; 340/567; 367/94
[58] Field of Search ...................................... 340/511, 552, 340/553, 554, 567; 367/94

[56] References Cited

U.S. PATENT DOCUMENTS

| | | | |
|---|---|---|---|
| 3,074,053 | 1/1963 | McDonough et al. | 340/522 |
| 3,611,361 | 10/1971 | Gallichotte | 340/408 |
| 3,732,555 | 5/1973 | Strenglein | 340/552 |
| 3,801,978 | 4/1974 | Gershberg et al. | 340/554 |
| 3,838,408 | 9/1974 | McMaster | 340/541 |
| 3,967,283 | 6/1976 | Clark et al. | 340/554 |
| 4,003,045 | 1/1977 | Stockdale | 342/28 |
| 4,051,472 | 9/1977 | Albanese et al. | 340/554 |
| 4,064,509 | 12/1977 | Stockdale | 340/556 |
| 4,068,232 | 1/1978 | Meyers et al. | 342/44 |
| 4,090,195 | 5/1978 | Guennou et al. | 340/554 |
| 4,295,131 | 10/1981 | Bonori et al. | 342/28 |
| 4,322,722 | 3/1982 | Kozdon | 340/554 |
| 4,337,481 | 6/1982 | Mick et al. | 348/440 |
| 4,358,759 | 11/1982 | Stewart et al. | 340/554 |
| 4,401,976 | 8/1983 | Stadelmayr | 340/554 |
| 4,437,089 | 3/1984 | Archard | 340/522 |
| 4,536,752 | 8/1985 | Cheal et al. | 340/554 |
| 4,625,199 | 11/1986 | Pantus | 340/554 |
| 4,660,024 | 4/1987 | McMaster | 340/554 |
| 4,710,750 | 12/1987 | Johnson | 340/554 |
| 4,736,097 | 4/1988 | Philipp | 340/556 |
| 4,829,306 | 5/1989 | Gjessing et al. | 342/159 |
| 4,831,438 | 5/1989 | Bellman, Jr. et al. | 348/148 |
| 4,833,450 | 5/1989 | Buccola et al. | 340/554 |
| 4,882,567 | 11/1989 | Johnson | 340/554 |
| 4,942,384 | 7/1990 | Yamauchi et al. | 340/522 |
| 5,001,348 | 3/1991 | Dirscherl et al. | 250/372 |
| 5,077,548 | 12/1991 | Dipoala | 340/554 |
| 5,150,099 | 9/1992 | Lienau | 340/552 |
| 5,216,410 | 6/1993 | Pildner et al. | 340/522 |
| 5,276,427 | 1/1994 | Peterson | 340/522 |
| 5,331,308 | 7/1994 | Buccola et al. | 340/554 |

Primary Examiner—Thomas Mullen
Assistant Examiner—Mark S. Rushing
Attorney, Agent, or Firm—John R. Mugno

[57] ABSTRACT

An apparatus and method for varying the sampling frequency of a Doppler effect device, based on environmental conditions, is described comprising: (i) a transmitter for transmitting energy into a protected area; (ii) a receiver for receiving energy reflected from the protected area and for transforming the received energy into a motion detection signal which is proportional to any Doppler energy received by the receiver; (iii) a processor responsive to the motion detection and operative to automatically modify the sampling frequency when the motion detection signal exceeds a predetermined threshold value and the apparatus has not been operated at each of a plurality of sampling frequencies; and (iv) an alarm coupled to the processor activated when the motion detection signal exceeds the predetermined threshold value and the apparatus has been operated at each of the plurality of sampling frequencies. The device is useful in minimizing unstable Doppler effect channels in both single and dual technology devices.

21 Claims, 6 Drawing Sheets

|    | CTREG | BFLY |    |
|----|-------|------|----|
| 0  | 0000  | 0000 | 0  |
| 1  | 0001  | 1000 | 8  |
| 2  | 0010  | 0100 | 4  |
| 3  | 0011  | 1100 | 12 |
| 4  | 0100  | 0010 | 2  |
| 5  | 0101  | 1010 | 10 |
| 6  | 0110  | 0110 | 6  |
| 7  | 0111  | 1110 | 14 |
| 8  | 1000  | 0001 | 1  |
| 9  | 1001  | 1001 | 9  |
| 10 | 1010  | 0101 | 5  |
| 11 | 1011  | 1101 | 13 |
| 12 | 1100  | 0011 | 3  |
| 13 | 1101  | 1011 | 11 |
| 14 | 1110  | 0111 | 7  |
| 15 | 1111  | 1111 | 15 |

FIG. 5

MICROWAVE SENSOR WITH ADJUSTABLE SAMPLING FREQUENCY BASED ON ENVIRONMENTAL CONDITIONS

FIELD OF THE INVENTION

This invention is generally directed to an improved Doppler effect intrusion alarm apparatus, and more particularly, to a Doppler effect intrusion alarm apparatus capable of adjusting its sampling frequency based on detected environmental conditions.

BACKGROUND OF THE INVENTION

Prior art Doppler effect intrusion devices, such as microwave motion sensing devices, are well-known and widely used in the field. In essence, a transmitter, powered by a drive circuit, transmits wave energy into a protected area. Reflected energy is received by the sensor and added to a small part of the transmitted energy. The resulting signal is detected and sampled at a high enough rate, according to known Nyquist Theorem calculations, to provide an audio frequency signal containing information about the motion in the protected area.

Unfortunately, there are countless noise sources present at sufficient levels to result in false alarms. Examples of such noise sources are ionization effects of florescent lights and TV or computer monitors, building vibrations, conducted and radiated noise related to the public utility frequency or harmonics of that frequency, power supply noise from data transmission or poor regulation, other active sensors, radiated electromagnetic noise from intentional and unintentional transmitters, etc. Many times more than one of these noise sources is present in an protected environment.

There are prior art Doppler effect devices which pulse the transmitter at a predetermined frequency to save power and, because sampling must occur when the transmitter is on, subsequently sample at that frequency. An example of such a device is described in Bonori et al. U.S. Pat. No. 4,295,131. However, such devices are not designed to eliminate the negative effects of noise sources.

Another prior art reference, Kozden U.S. Pat. No. 4,322,722, recognizes and attempts to solve the problem of periodic noise sources (such as fluorescent lights) which interfere with system performance by establishing a sampling frequency which has been synchronized with the noise source. This technique has numerous shortcomings including the fact that it is useful only in environments with a single periodic noise source (or perhaps, absolutely synchronous multiple noise sources). For instance, if two non-synchronous noise sources were present, the Kozden circuit could synchronize only to one source or the other. Thus, a preferred sampling frequency for environments with two asynchronous noise sources could not be established using the Kozden teaching. Additionally, the inclusion of supplemental sensing circuitry required to detect the single noise source and additional circuitry to synchronize the sampling frequency accordingly increases manufacturing complexity and cost of each unit.

More recently in the prior art, there have been efforts by alarm manufacturers to create security alarm devices which can be automatically adjusted based on environmental concerns in order to minimize the occurrence of false alarms. For instance, in Buccola et al. U.S. Pat. No. 5,331,308, there is shown, in conjunction with a dual technology device, an apparatus for adjusting the sensitivity of a sub-system when it indicates an alarm condition not confirmed by the complimentary sub-system. This adjustment can be made either by adjusting the gain on a sub-system channel or adjusting the number of digital counts required to establish a threshold indicating an alarm condition. Despite the advancements provided by such automatically adjustable sensitivity devices and the wide commercial acceptance of this technology, in terms of a Doppler effect device, if the sampling frequency is set at a value such that it constantly detects the noise source, a false alarm may issue no matter what value the sensitivity level is set.

One common source of periodic noise, referenced above, relates to disturbance caused by another pulsed sensor within radio range of the first sensor zone. In such applications, the following parameters can be defined:

Frf1=RF frequency of first sensor.

Frf2=RF frequency of second sensor.

Fs1=sampling frequency of first sensor.

Fs2=sampling frequency of second sensor.

Fn1=frequency of noise (caused by detection of Frf1 and Frf2 together) of first sensor.

Fn2=frequency of noise (caused by detection of Frf1 and Frf2 together) of second sensor.

Fnm1=modulation frequency of noise detected by first sensor.

Fnm2=modulation frequency of noise detected by second sensor.

Furthermore, the following conditions typically exists in such applications:

Fs1 approximately is equal to Fs2, and each unit is pulsing its transmitter at it sampling frequency.

When the above conditions and parameters are set, two pulsing sensors will interfere with each other according to the following calculations:

Fn1=Fn2=|Frf2−Frf1| with Fn1 and Fn2 modulated at Fnm1=Fnm2=|Fs2−Fs1|.

Other known relationships between Fn1 and Fn2 also exist which might cause an increase or decrease in stability but are unnecessary to elaborate upon for present purposes. These relationships relate to harmonics, sub-harmonics, common denominators, etc.

The prior art solution to the condition of two pulsed sensors interfering with each other as set forth above consists of separating Frf1 and Frf2 such that the difference is out of the pass band of the audio amplifier which follows the receiver. Unfortunately, there are at least three major disadvantages of implementing this solution. First, sufficient separation of the RF frequencies Frf1 and Frf2 might require signals outside the operating frequency limits set by the FCC. Secondly, manufacturing procedures are greatly complicated since devices with separate operating frequencies require various tuning procedures and markings for the different frequencies. Obviously, this complication of production results in a higher cost per unit. Thirdly, the preprogrammed separation of Frf1 and Frf2 is not field selectable based on environmental conditions.

In view of the aforementioned and other deficiencies in the prior art, it is therefore an object of the present invention to provide a new and improved Doppler effect device and method which is capable of adjusting its sampling frequency based upon environmental conditions detected by the device itself.

It is yet another object of the present invention to provide a new and improved Doppler effect device and method which is capable of adjusting its sampling frequency in uniform incremental or decremental steps.

It is another object of the present invention to provide a new and improved Doppler effect and method which is capable of adjusting its sampling frequency in non-uniform steps.

It is still another object of the present invention to provide a new and improved Doppler effect device and method which stores particular sampling frequencies which eliminate false alarms.

It is an additional object of the present invention to provide a new and improved Doppler effect device and method which can effectively adjust its sampling frequency to eliminate the effects of periodic noise in either single or dual technology devices.

It is an yet still another object of the present invention to provide a new and improved Doppler effect device and method which can effectively adjust its sampling frequency even if multiple noise sources are present in a protected area.

It is a further object of the present invention to provide a new and improved Doppler effect device and method which doesn't require additional circuitry to modify the sampling frequency of the device.

It is yet another important object of the present invention to provide a new and improved Doppler effect device and method which can effectively eliminate the detrimental effects of neighboring Doppler effect devices by, instead of designing the devices to separate Frf1 and Frf2, automatically changing the difference between Fs1 and Fs2 (based on detected environmental conditions) such that the modulation frequency (Fnm1=Fnm2) is outside the pass band of the audio amplifier which follows the receiver. This improved device and method permits: (i) all units to operate on one FCC approved RF frequency, (ii) all units to be produced and marked identically (thus reducing the cost per unit), and (iii) the units to be automatically adjusted in the field based on environmental conditions.

Further objects and advantages of the present invention will become apparent as the following description proceeds.

SUMMARY OF THE INVENTION

Briefly stated and in accordance with the preferred embodiment of the present invention, an apparatus and method for varying the sampling frequency of a Doppler effect device, based on environmental conditions, is described comprising: (i) transmitter means for transmitting energy into a protected area; (ii) receiver means for receiving energy reflected from said protected area and for transforming said received energy into a motion detection signal consideration of the following description, taken in conjunction with the accompanying drawings, wherein:

FIG. 1 is a block diagram of the circuit for single technology and dual technology embodiments of a Doppler sensor device of the present invention;

FIG. 2 is a flow diagram of the microwave sampling frequency adjustment program of the device of FIG. 1 in a single technology embodiment;

FIG. 3 is a flow diagram of the microwave sampling frequency adjustment program in a uniform manner of the device of FIG. 1 in a dual technology embodiment;

FIG. 4 is a flow diagram of the microwave sampling frequency adjustment program in a non-uniformed manner for the device of FIG. 1 in a dual technology device;

FIG. 5 is a table indicating the non-uniform steps in sampling frequency as described in FIG. 4; and FIG. 6 is a graphical illustration of the effects on stability of a Doppler effect device of two non-synchronous noise sources at various sampling frequencies.

DETAILED DESCRIPTION OF THE DRAWINGS

Referring to FIG. 1, a block diagram of an intruder detection apparatus, generally designated 10, is shown in accordance with the teachings of the present invention. FIG. 1 includes a microwave sub-system 12 and a passive infrared (PIR) sub-system 14. PIR sub-system 14 is shown within a dashed box to indicate that the present invention can be incorporated either within a dual technology device (including complimentary sub-systems) or a single technology microwave (or other Doppler effect) device.

Specific circuitry contained within the boxes of FIG. 1 is widely known and used in the field of the security industry and thus will not be described in detail herein. In essence, microwave sub-system 12 includes a transmitter 16 and a receiver 18. Transmitter 16 emits energy 20 while receiver 18 detects received energy 22. The sampling frequency, while technically pertaining only to the sampling of received signal by receiver 18, is equivalent, in this example, to the frequency of emitted energy 20 transmitted by transmitter 16 as indicated by lines 17 and 17'. The value of the sampling frequency is set based on instructions from a central processing unit (CPU) 24 as applied to a drive circuit 26. The command sent along a line 25 from CPU 24 to drive circuit 26 represents part of the advancement of the present invention. As will be seen later, the sampling frequency established along line 25 will depend upon environmental condetermines whether the signal along line 34 (FIG. 1) is sufficient to "trip" the microwave channel. If the answer to this inquiry is no, the single technology device continues to monitor protected area 28. Alternatively, if microwave subsystem 12 has been tripped, the sampling frequency will be incremented in an attempt to eliminate the possibility that the trip has been caused by a noise source and not by an actual intruder. This step is indicated by box 42. Of course, there can only be a finite series of incremental sampling frequencies which sub-system 12 can operate. Thus, as reflected in box 44, a determination is made whether the sampling frequency is at its maximum value. If the sampling is at its maximum value, and microwave sub-system 12 has been tripped, an alarm will be registered (box 46). Alternatively, if the sampling frequency has not reached its maximum value, microwave sub-system 12 will continually adjust the sampling frequency until all possible sampling frequencies have been tried. If, at that point, sub-system 12 remains tripped, an alarm is issued (box 46). It will be noted by those skilled in the art that the flow diagram of FIG. 2 assumes that each sampling frequency can be tried at a fast enough speed to process an alarm, after all frequency repetitions, without unnecessarily impacting catch performance of the apparatus. It should also be noted that the flow diagram of FIG. 2 assumes equal incremental steps in sampling frequency for each pass through the flow chart. Additionally, decremental uniform steps can also be used. As will be seen below, alternative methods of modifying the sampling frequency can also be used.

Referring now to FIG. 3, a flow diagram for use in an dual technology apparatus (i.e., one which incorporates PIR sub-system 14) is shown. Again, the microwave channel (sub-system 12) is monitored to detect the presence of an intruder. If no intruder detection is indicated, the dual technology device simply continues to monitor protected area 28. Alternatively, once the microwave channel has been tripped, the sampling frequency will be incrementally increased between a minimum sampling frequency and a maximum sampling frequency. This step is indicated in box 52. Next, in decision box 54, a determination is made whether the sampling frequency is at its maximum value. If the answer to this inquiry is yes, the sampling frequency is reset to its original minimal value and the CPU looks to determine whether PIR sub-system 14 is also indicating an alarm condition (boxes 58 and 60). If so, an alarm is processed as indicated by box 62. Conversely, if PIR sub-system 14 does not indicate and alarm condition, the apparatus goes back to monitoring microwave sub-system 12. The net result of the flow diagram indicated in FIG. 3 is that the microwave channel will eventually stabilize.

Referring now to FIG. 4, a more complicated, but preferred, technique of switching sampling frequencies of a Doppler effect device based on environmental conditions is shown. In many ways FIG. 4 is similar to FIG. 3 in that numerous sampling frequencies are tried on microwave sub-system 12 in an attempt to eliminate the undesirable effect of a noise source. However, while in FIG. 3, it is assumed that the sampling frequency modifications occur in incrementally increasing steps, FIG. 4 describes a more efficient means of altering the sampling frequency. This improvement is best described by the following example.

Assuming that the intrusion detection apparatus is operable between 300 Hz and 600 Hz and there are four digital bits used to modify the sampling frequency, one possibility is to start at a 300 Hz sampling frequency level and engage in up to fifteen 20 Hz steps in an attempt to achieve a stable sampling frequency. Unfortunately, if the desired sampling frequency is 580 Hz, it will always take 14 steps for microwave sub-system 12 to reach its stable condition. One way to overcome this difficulty, in either the flow diagram of FIG. 3 or FIG. 4, is to store in memory 66 (shown in FIG. 1) those sampling frequencies which provide the desired stability of the apparatus and restart the device at that value.

It may also be desirable to switch sampling frequencies in an non-uniform manner. In FIG. 4, box 70 is similar to box 50 of FIG. 3. However, instead of then simply increasing the sampling frequency, a count register (CTREG) is instead increased. In the example of the flow diagram of FIG. 4, we have assumed that CTREG can vary from 0 to 15. If the count register has run through all its possibilities (box 74) the count register is cleared. Alternatively, if the count register is not at its maximum value, a calculation is made to convert the count register into butterfly (BFLY) bit values. Although this calculation can take many forms, FIG. 5 describes a scheme whereby the most significant bit of the count register becomes the least significant bit of the BFLY register, the second most significant bit of the count register becomes the second least significant bit of the BFLY register, etc. Thus, the count register value of 1 (binary 0001) converts to a BFLY register value of 8 (binary 1000), a count register value of 5 (binary 0101) converts to a BFLY register value of 10(1010), etc. as shown in FIG. 5. Using our previous simplified example whereby each incremental number of the BFLY equals 20 Hz and a minimum sampling frequency of 300 is utilized, box 78 will result in frequencies of 300 Hz, 460 Hz, 380 Hz, etc. according to the table presented in FIG. 5. The rest of FIG. 4 is similar to the flow diagram of FIG. 3.

Another advantage of the present invention, as mentioned above, is that the stable frequency stored in memory 66 can be used as a starting point for the various sampling frequency incorporated. Thus, if count register value 8 (BFLY register value 1) creates a stable channel, the device can be made to reset to this value instead of going back to the minimum sampling frequency.

Interestingly, the teachings of the present invention can be used even when the original sampling frequency does not cause a false alarm. For instance, by running the aforementioned software, it is possible to ascertain precisely the frequency range of periodic noise conditions. In other words, if the software is run and a false alarm is consistently detected at a specific frequency, processing can be incorporated to determine the frequency of the noise causing source. Furthermore, it is possible to determine the relative speed to or from the unit of the target. Other calculations are also possible once such information is ascertained.

FIG. 6 is a graphical illustration of the type of stability of Doppler effect devices which can be overcome using the teachings of the present invention. The signal at the top of FIG. 6 represents the amplitude of noise at the device's audio amplifier when the protected area includes two noise sources. It should be noted the combination of the two noise sources results in an asynchronous noise pattern. Thus, prior art devices which are able to "lock on" to a single periodic noise source are totally ineffective in such environments.

In FIG. 6, the amplitude of the noise at the device's audio amplifier is referenced against an amplitude of an ideal environment (where no noise is present). The resulting effect on the stability of the device after incorporating known digitalization processes such as pulse counting, is shown in the bottom portion of FIG. 6. In this example, the sampling frequency range is shown as varying between 200 Hz and 3 kHz. Along this sampling frequency range, the device will not be stable except at approximately between the following sampling frequency ranges: (i) 220–360 Hz, (ii) 420–460 Hz, (iii) 1.45–1.5 kHz, and (iv) 2.05–2.2 kHz. At all other sampling frequencies, the Doppler effect device would be unstable. The Doppler effect device of the present invention is designed to permit itself to automatically operate with a sampling frequency of one of the four permissible ranges provided. Of course, in each environment (or at various times within the same environment), the graphical analysis of FIG. 6 will be different. Thus, stable sampling frequencies will also vary.

The present invention permits the sensor to optimally perform based on the unique characteristics of its environment. For instance, some widely acknowledged variables relating to stability of a pulsed microwave motion sensor when subjected to noise are frequency content of noise from building vibrations, various possible detected frequencies from multiple florescent lights in a protected area, RF frequencies of the sensor and of an interfering sensor, pulse frequency and width of an interfering sensor, sampling frequency and sample time of the subject sensor, and the sensor's response to AM modulation effects of sampling close to the noise frequency. However, a list of variables affecting a sensor's susceptibility to all conceivable noise sources is obviously not complete nor can the best sampling frequency be determined in advance. The only true indication that the sampling frequency is an acceptable one (to provide the best chance of stability) is a sensor's stability itself. Thus, the present invention uses the stability of the sensor itself as the means to determine the best sampling frequency.

It will be apparent from the foregoing description that the present invention provides a Doppler effect device which greatly reduces false alarms in either a single technology or dual technology apparatus. While there has been shown and described what is presently considered the preferred embodiment of this invention, it will be obvious to those skilled in the art that various changes and modifications may be made without parting from the broader aspects of this invention. For instance, although the invention has been described in either a single technology or dual technology apparatus, the improved device and method can be incorporated in a quad device or any other combination of sensors. Furthermore, there are numerous techniques of modifying the sampling frequency to determine a stable sampling frequency from that previously known and used for this forming said received energy into a motion detection signal which is proportional to any Doppler energy received by said receiver means; (iii) processing means responsive to said motion detection and operative to automatically modify said sampling frequency when said motion detection signal exceeds a predetermined threshold value and said apparatus has not been operated at each of said plurality of sampling frequencies; and (iv) alarm generating means coupled to said processing means activated when said motion detection signal exceeds said predetermined threshold value and said apparatus has been operated at each of said plurality of sampling frequencies. The device is useful in minimizing unstable Doppler effect channels in both single and dual technology devices.

BRIEF DESCRIPTION OF THE DRAWINGS

While the specification concludes with claims particularly pointing out and distinctly claiming the subject matter regarded as the invention herein, it is believed that the present invention will be more readily understood upon alarm generating means coupled to said processing means activated when said motion detection signal exceeds said predetermined threshold value and said apparatus has been operated at each of said plurality of sampling frequencies.

2. The apparatus of claim 1 wherein said apparatus is a microwave device.

Figure 1:
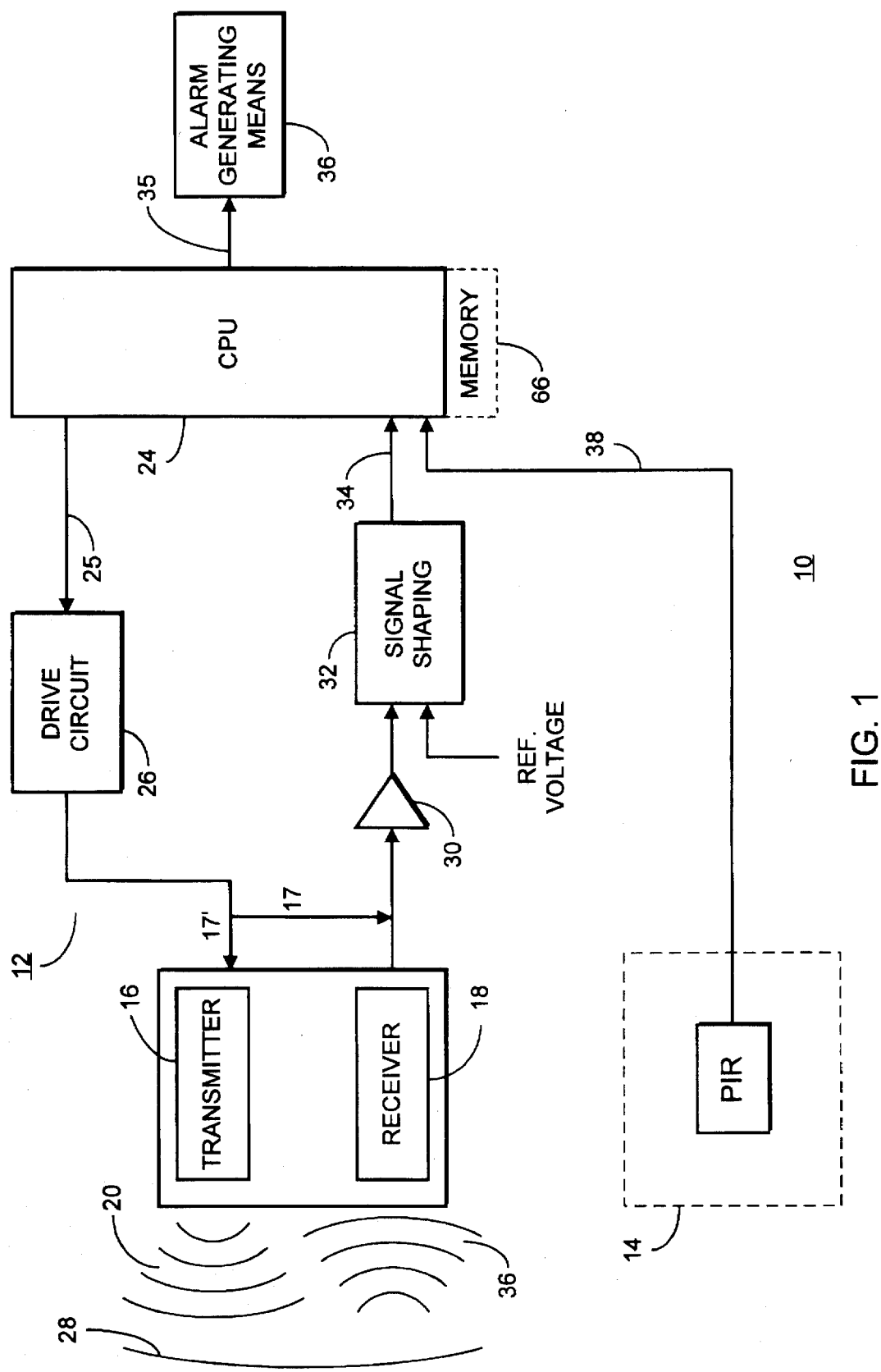

3. The apparatus of claim 1 wherein said processing means is a microprocessor.

4. The apparatus of claim 1 further comprising:

storage means for maintaining a record of sampling frequencies which do not result in motion detection signal exceeding said predetermined threshold value.

5. A Doppler effect intrusion alarm apparatus operating at a first sampling frequency and a second higher sampling frequency to detect intruders comprising:

transmitter means of said apparatus for transmitting energy into a protected area;

receiver means of said apparatus for receiving energy reflected from said protected area initially at said first sampling frequency and for transforming said received energy into a motion detection signal which is proportional to any Doppler energy received by said receiver means;

processing means responsive to said motion detection signal and operative to automatically increase said first sampling frequency to said second higher sampling frequency when said motion detection signal exceeds a predetermined threshold value; and alarm generating means coupled to said processing means activated when said motion detection signal exceeds said predetermined threshold value and said apparatus is operating at said second higher sampling frequency.

6. The apparatus of claim 5 wherein said apparatus is a microwave device.

7. The apparatus of claim 5 wherein said processing means is a microprocessor.

8. A method of detecting an intruder in a protected area utilizing a Doppler effect apparatus operable to detect intruders at a plurality of sampling frequencies and comprising the steps of:

transmitting energy from said apparatus into said protected area;

receiving energy at said apparatus reflected from said protected area, the sampling frequency established along line 25 will depend upon environmental conditions detected in a protected area 28.

The signal detected at receiver 18 is typically passed through a band pass filter 30 to eliminate unwanted portions of the signal and then to a signal shaping circuit 32. Ultimately, an electrical signal is passed along line 34 to CPU 24. It should be noted that a reference voltage is applied to signal shaping circuit 32 to establish a threshold voltage for the circuit. Generally, if the signal passed along a line 34 from signal shaping circuit 32 to CPU 24 is above the threshold voltage, an alarm activation signal will be passed along line 35 to an alarm generating means 36.

In a dual technology embodiment, whereby PIR subsystem 14 is operative, an alarm activation signal will be passed along line 35 to alarm generating means 36 only when the signal along a line 38 also indicates the presence of an intruder in protected area 28.

Figure 2:
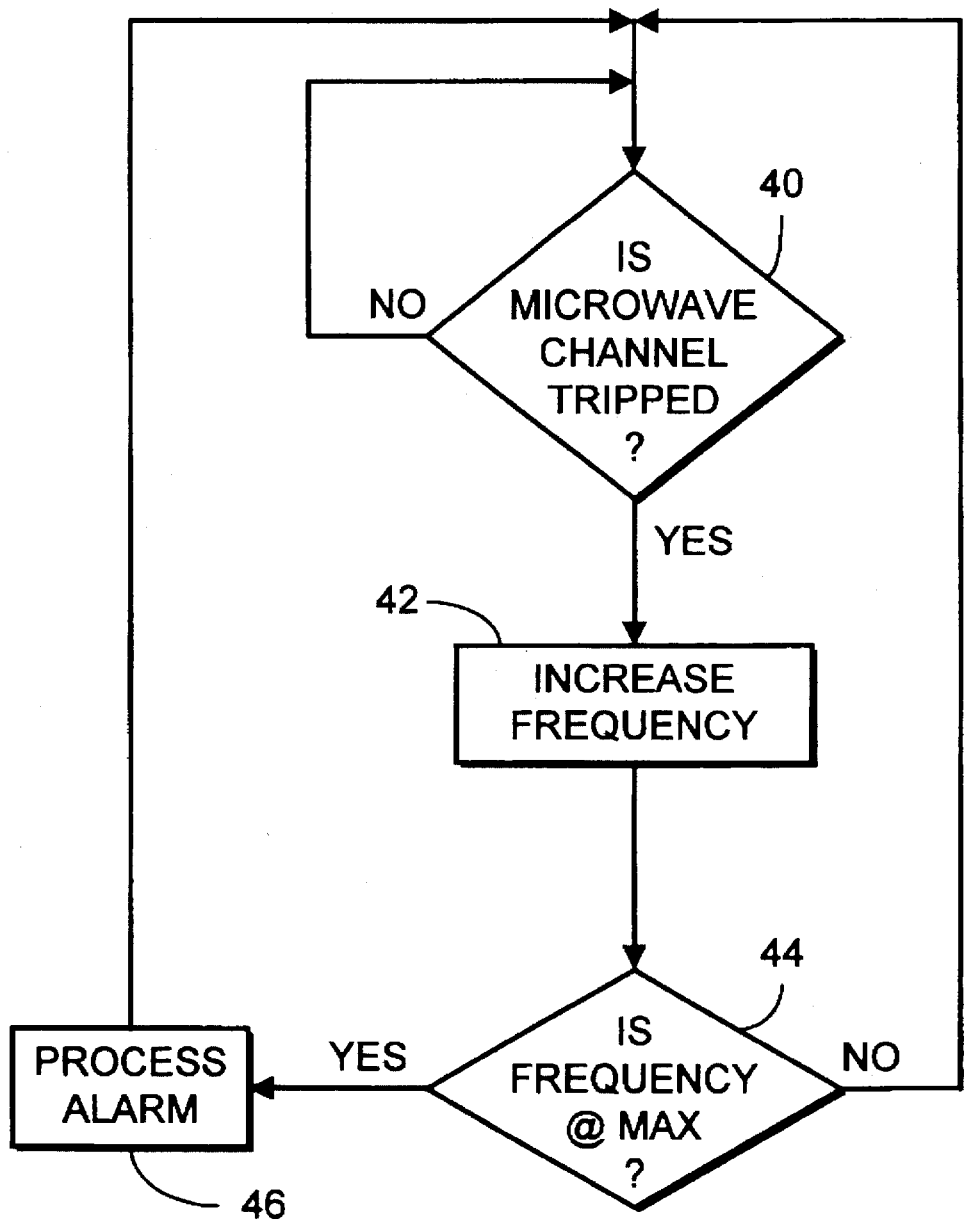
Figure 3:
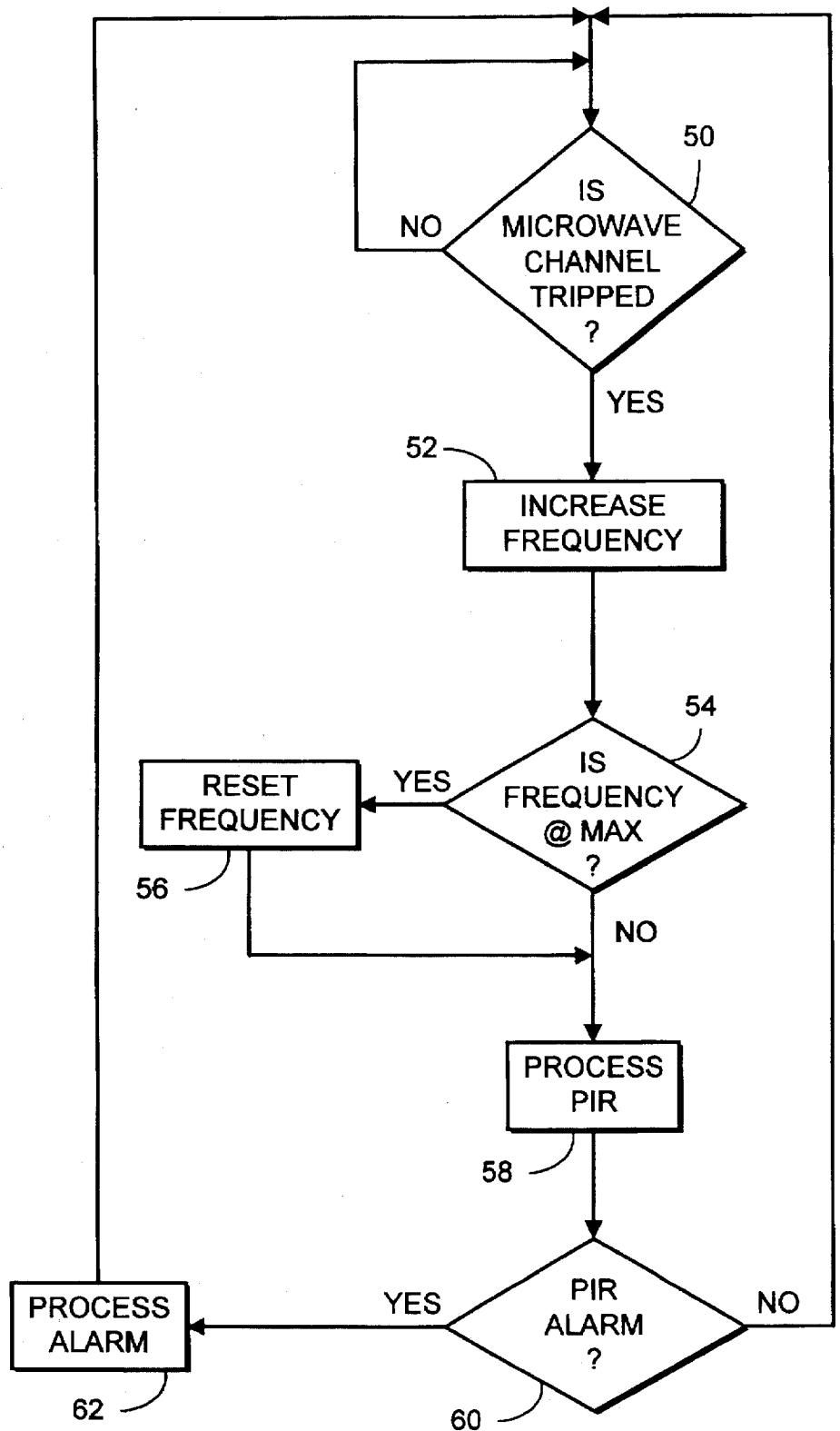
Figure 4:
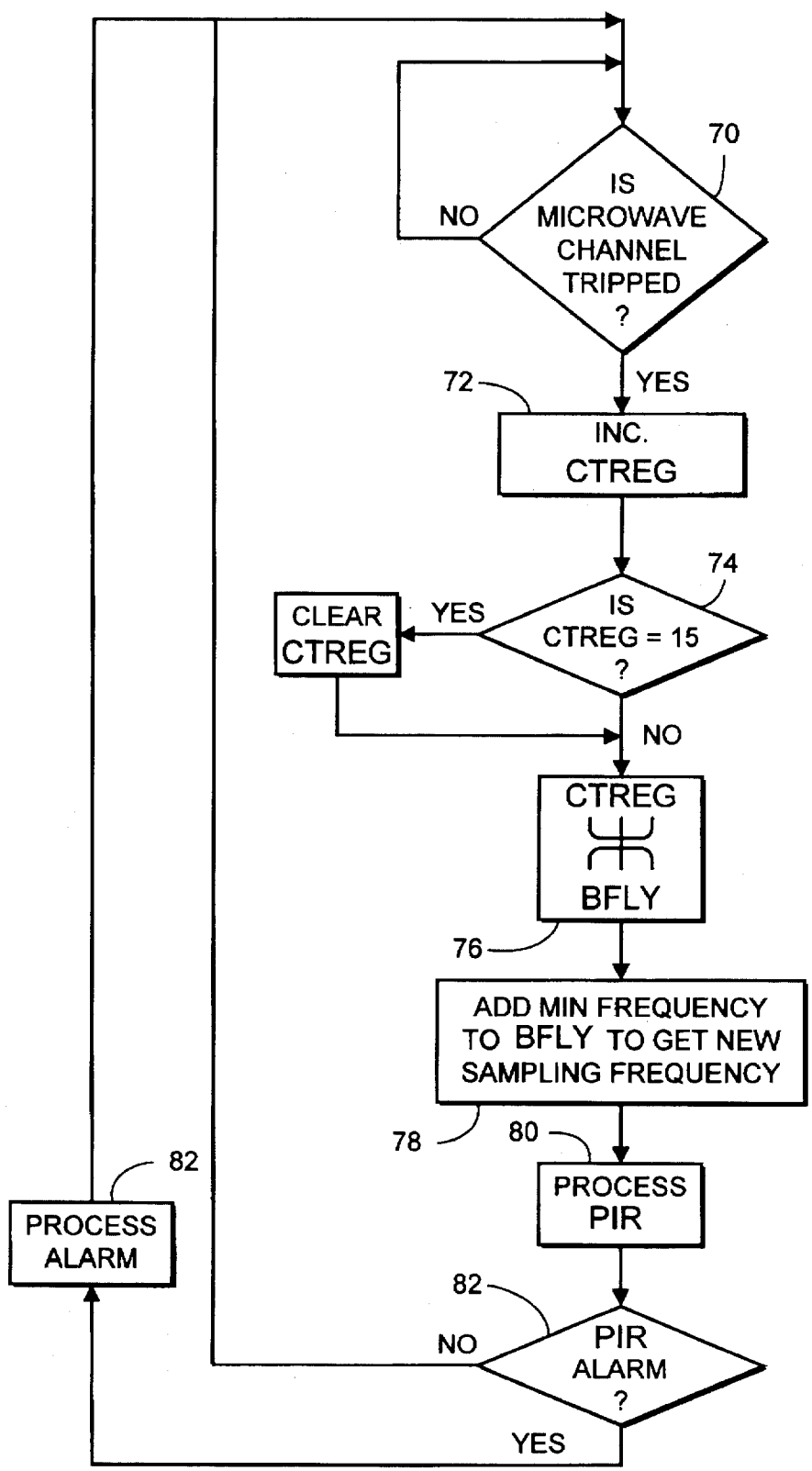
Figure 6:
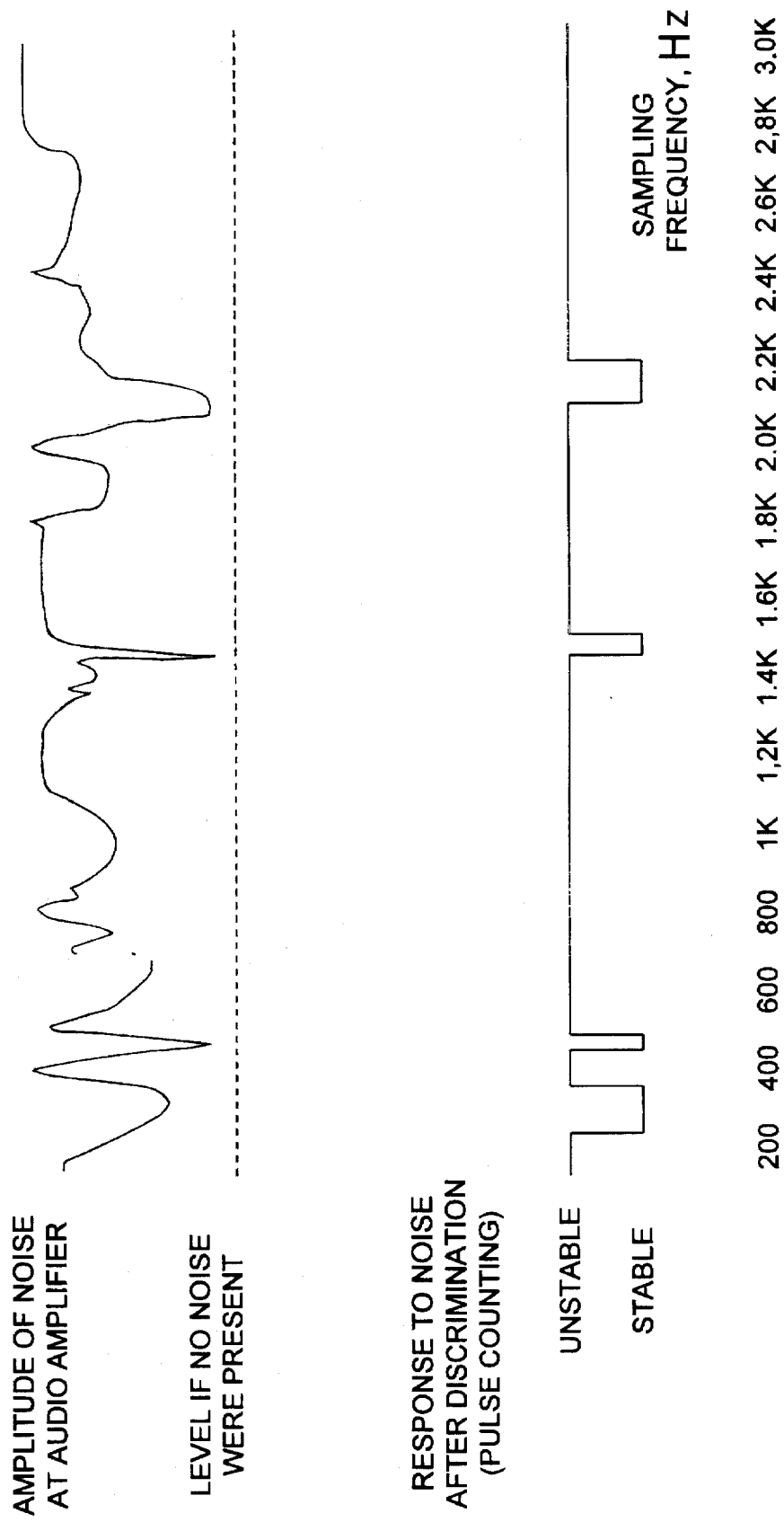

Referring now to FIG. 2, a portion of the flow chart software run within CPU 24 is shown in the case where PIR sub-system 14 is not functional. In decision box 40, CPU 35

11. The method of claim 8 further comprising the step of:

storing a record of sampling frequencies which do not result in said motion detection signal exceeding said predetermined threshold value.

12. A method of detecting an intruder in a protected area utilizing a Doppler effect apparatus operable to detect intruders at a first sampling frequency and a second higher sampling frequency comprising the steps of:

transmitting energy from said apparatus into said protected area;

receiving energy at said apparatus reflected from said protected area initially at said first sampling frequency;

developing a motion detection signal which is proportional to any Doppler energy in said receiver energy;

automatically increasing said first sampling frequency to said second higher sampling frequency when said motion detection signal exceeds a predetermined threshold value; and activating an alarm generating means when said motion detection signal exceeds said predetermined threshold value and said apparatus is operating at said second higher sampling frequency.

13. A dual technology intruder detection system for monitoring a protected area including a first intruder detection sub-system of the type utilizing Doppler effect technology for issuing a first activation signal upon detection of an intruder and a second intruder detection sub-system capable for issuing a second activation signal upon detection of an intruder, such system comprising:

transmitter means associated with said first sub-system for transmitting energy into said protected area;

receiving means associated with said first sub-system for receiving energy reflected from said protected area at an initial sampling frequency and for transforming said received energy into a motion detection signal which is proportional to any Doppler energy received by said receiver means;

comparing means for comparing said motion detection signal with a predetermined threshold value for generating said first activation signal when said motion detection signal exceeds said predetermined threshold value;

processing means coupled to said first and second sub-systems operative to automatically modify said initial sampling frequency upon receipt of said first activation signal and the absence of said second activation signal from said second sub-system; and alarm generating means coupled to said processing means activated upon the presence of first activation and second activation signal.

14. The system of claim 13 wherein said first sub-system is a microwave device.

15. The system of claim 14 wherein said second sub-system is a passive infrared device.

16. The system of claim 13 further comprising:

storing means for maintaining a record of sampling frequencies which do not result in generation of said first activation signal.

17. A method of detecting a intruder in a protected area utilizing a dual technology intruder apparatus having a first intruder detection sub-system of the type utilizing Doppler effect technology for issuing a first activation signal upon detection of an intruder and a second sub-system for ensuring a second activation signal upon detection of an intruder comprising the steps of:

modifying the sampling frequency of said first sub-system upon the presence of said first activation signal from said first sub-system and the absence of said second activation signal from said second sub-system; and activating an alarm generating means upon detection of both first and second activation signals.

18. The method of claim 17 further comprising the steps of:

storing a record of sampling frequencies which result in an absence of said first activation signal.

19. The method of claim 17 wherein modifying step is repeated either a predetermined number of times or until there is an absence of said first activation signal, whichever occurs first.

20. The method of claim 19 wherein said modifying step occurs in uniform steps.

21. The method of claim 20 wherein said modifying step occurs in non-uniform steps.

* * * * *